United States Patent
Thubert et al.

(10) Patent No.: US 9,485,157 B2
(45) Date of Patent: Nov. 1, 2016

(54) SYNCHRONIZED ROUTING UPDATES FOR TSCH NETWORKS

(71) Applicant: Cisco Technology, Inc., San Jose, CA (US)

(72) Inventors: Pascal Thubert, La Colle sur Loup (FR); Jean-Philippe Vasseur, Saint Martin d'Uriage (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 14/336,486

(22) Filed: Jul. 21, 2014

(65) Prior Publication Data
US 2016/0020967 A1    Jan. 21, 2016

(51) Int. Cl.
| | | |
|---|---|---|
| G01R 31/08 | (2006.01) | |
| H04L 12/26 | (2006.01) | |
| H04J 3/16 | (2006.01) | |
| H04W 40/24 | (2009.01) | |
| H04L 12/753 | (2013.01) | |

(52) U.S. Cl.
CPC .............. H04L 43/06 (2013.01); H04J 3/16 (2013.01); H04W 40/248 (2013.01); H04L 45/48 (2013.01)

(58) Field of Classification Search
None
See application file for complete search history.

(56) References Cited

U.S. PATENT DOCUMENTS

| | | | |
|---|---|---|---|
| 9,166,648 B2* | 10/2015 | Shudark ................... | H04B 1/69 |
| 2008/0232334 A1* | 9/2008 | Das ...................... | H04W 48/08 |
| | | | 370/337 |
| 2011/0164556 A1* | 7/2011 | Duan ................... | H04W 24/04 |
| | | | 370/328 |
| 2013/0016625 A1* | 1/2013 | Murias .................. | H04W 4/006 |
| | | | 370/254 |
| 2013/0121331 A1 | 5/2013 | Vasseur et al. | |
| 2014/0119284 A1* | 5/2014 | Baldemair .............. | H04L 5/003 |
| | | | 370/328 |
| 2016/0080058 A1* | 3/2016 | Kang ................... | H04B 7/0617 |
| | | | 370/329 |

OTHER PUBLICATIONS

Accettura, Nicola et al: "Decentralized Traffic Aware Scheduling for Multi-hop Low Power Lossy Networks in the Internet of Things," 2013 IEEE 14th International Symposium on a World of Wireless, Mobile and Multimedia Networks (WOWMOM), IEEE, Jun. 4, 2013, pp. 1-6.
International Search Report dated Oct. 9, 2015 in connection with PCT/US2015/040707.
Dujovne et al. "6TiSCH On-the-Fly Scheduling draft-dujovne-6tisch-on-the-fly-02", Feb. 14, 2014, pp. 1-10.
Thubert et al. "An Architecture for IPv6 over the TSCH mode of IEEE 802.15.4e draft-ietf-6tisch-architecture-03" Jul. 4, 2014, pp. 1-30.

(Continued)

*Primary Examiner* — Phirin Sam
(74) *Attorney, Agent, or Firm* — Parker Ibrahim & Berg LLC; James M. Behmke; Stephen D. LeBarron

(57) ABSTRACT

In one embodiment, a network node provides a time slotted channel hopping (TSCH) schedule to one or more child nodes of the network node. The TSCH schedule includes one or more mandatory routing protocol report time slots. The network node receives routing protocol reports from the one or more child nodes according to the TSCH schedule. The network node aggregates the received routing protocol reports into an aggregated routing protocol report. The network node provides the aggregated routing protocol report to a parent of the network node during a time slot that is subsequent to the one or more mandatory time slots for the one or more child nodes.

20 Claims, 20 Drawing Sheets

(56) References Cited

OTHER PUBLICATIONS

Vilajosana et al. "Minimal 6TiSCH Configuration draft-ietf-6tisch-minimal-02", Jul. 4, 2014, pp. 1-20.

Palattella et al. "Terminology in IPv6 over the TSCH mode of IEEE 802.15.4e draft-ietf-6tisch-terminology-02", Jul. 4, 2014, pp. 1-12.
Watteyne et al. "Using IEEE802.15.4e TSCH in an LLN context: Overview, Problem Statement and Goals draft-ietf-6tisch-tsch-01", Jul. 4, 2014, pp. 1-22.

* cited by examiner

//<br>

SYNCHRONIZED ROUTING UPDATES FOR TSCH NETWORKS

TECHNICAL FIELD

The present disclosure relates generally to computer networks, and, more particularly, to synchronized routing updates for time slotted, channel hopping (TSCH) networks.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
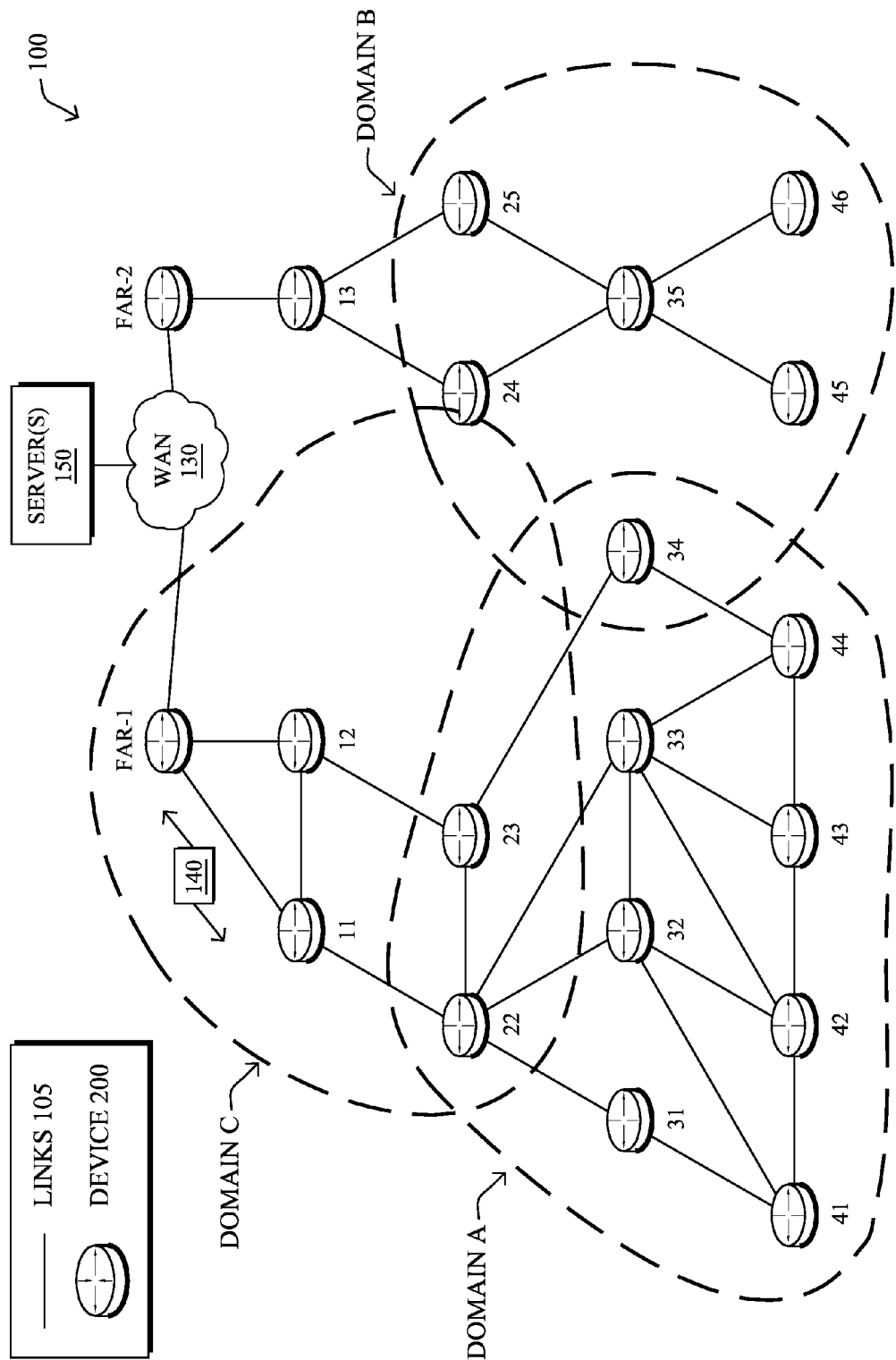
FIG. 1 illustrates an example communication network.

According to one or more embodiments of the disclosure, a network node provides a time slotted channel hopping (TSCH) schedule to one or more child nodes of the network node. The TSCH schedule includes one or more mandatory routing protocol report time slots. The network node receives routing protocol reports from the one or more child nodes according to the TSCH schedule. The network node aggregates the received routing protocol reports into an aggregated routing protocol report. The network node provides the aggregated routing protocol report to a parent of the network node during a time slot that is subsequent to the one or more mandatory time slots for the one or more child nodes.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," 'FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

Figure 2:
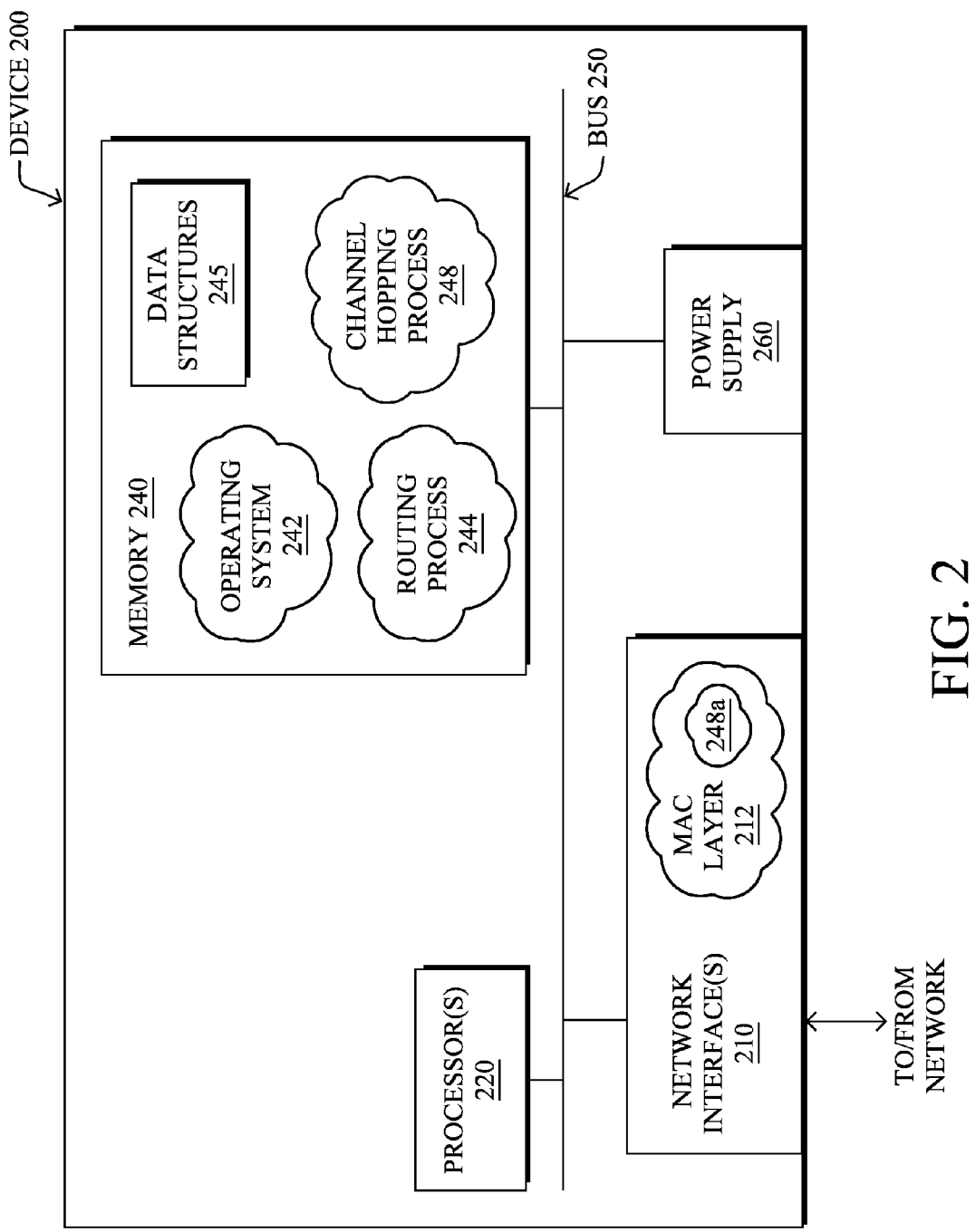
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative channel hopping process 248 as described in greater detail below. Note that while channel hopping process 248 is shown in centralized memory 240, alternative embodiments provide for the process to be specifically operated within the network interfaces 210, such as within a MAC layer 212 (as "process 248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012). Further, an example OF (e.g., a default OF) may be found in an IETF RFC, entitled "RPL Objective Function 0" <RFC 6552> by Thubert (March 2012) and "The Minimum Rank Objective Function with Hysteresis" <RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
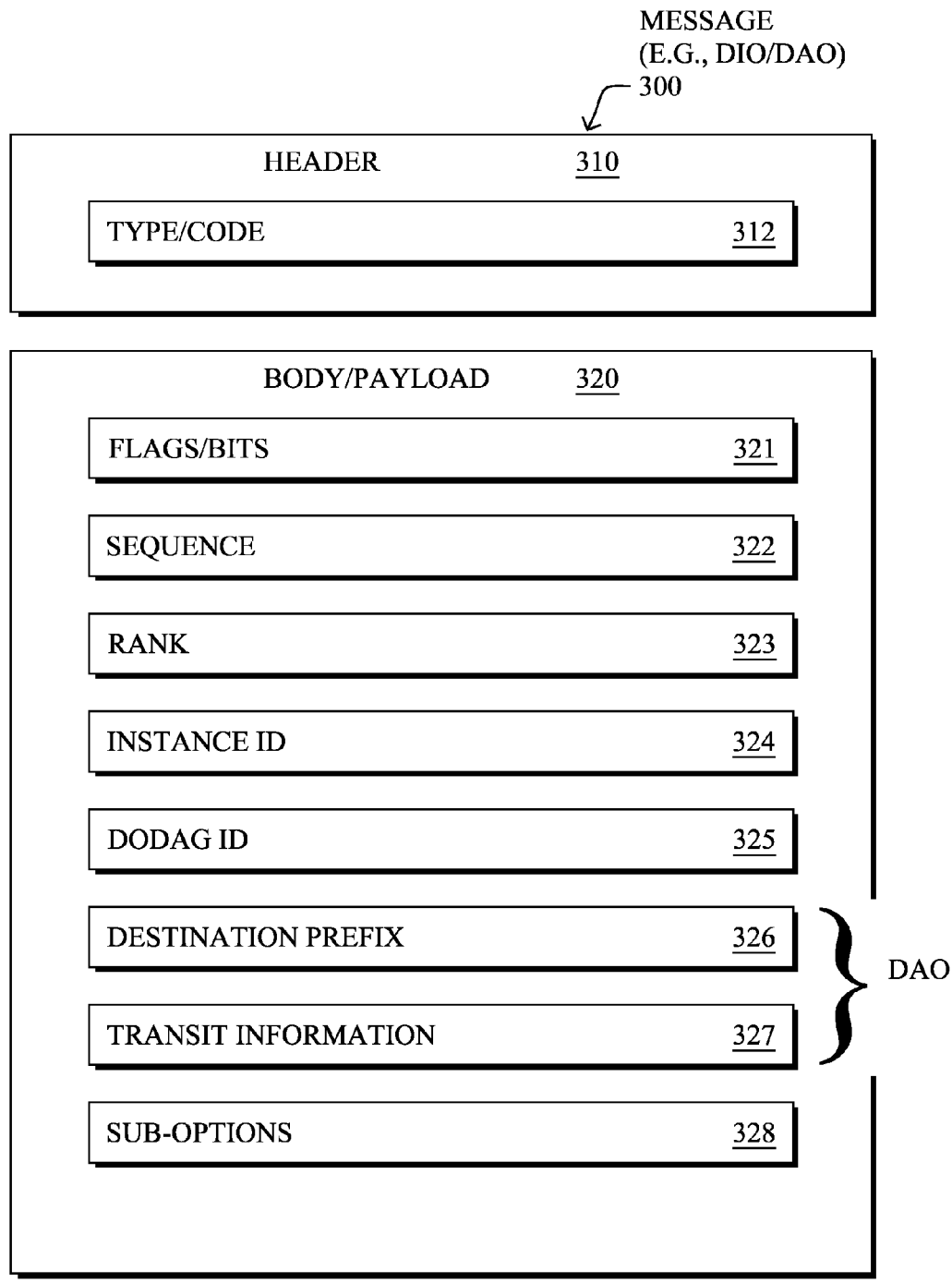
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
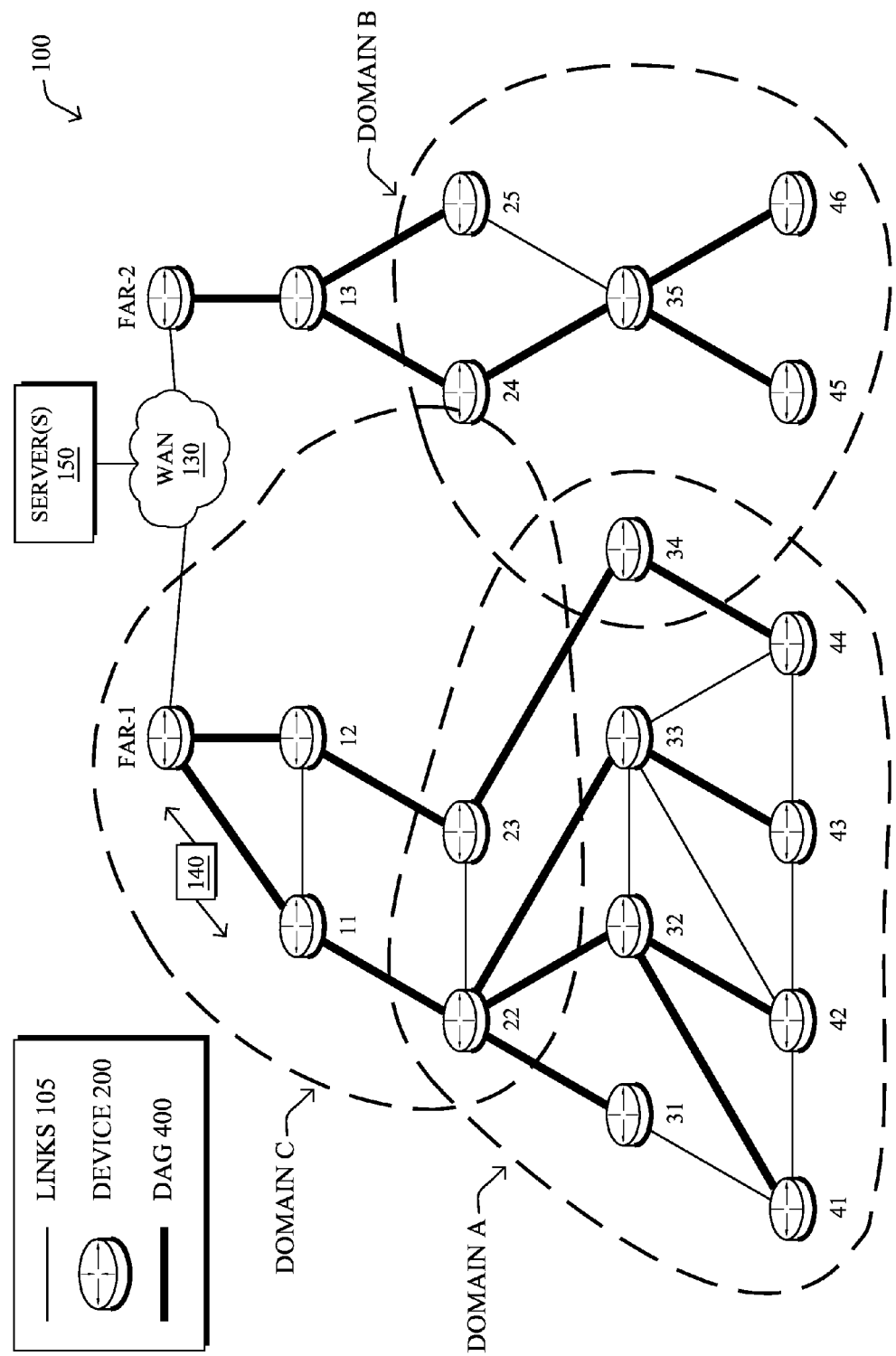
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH". The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
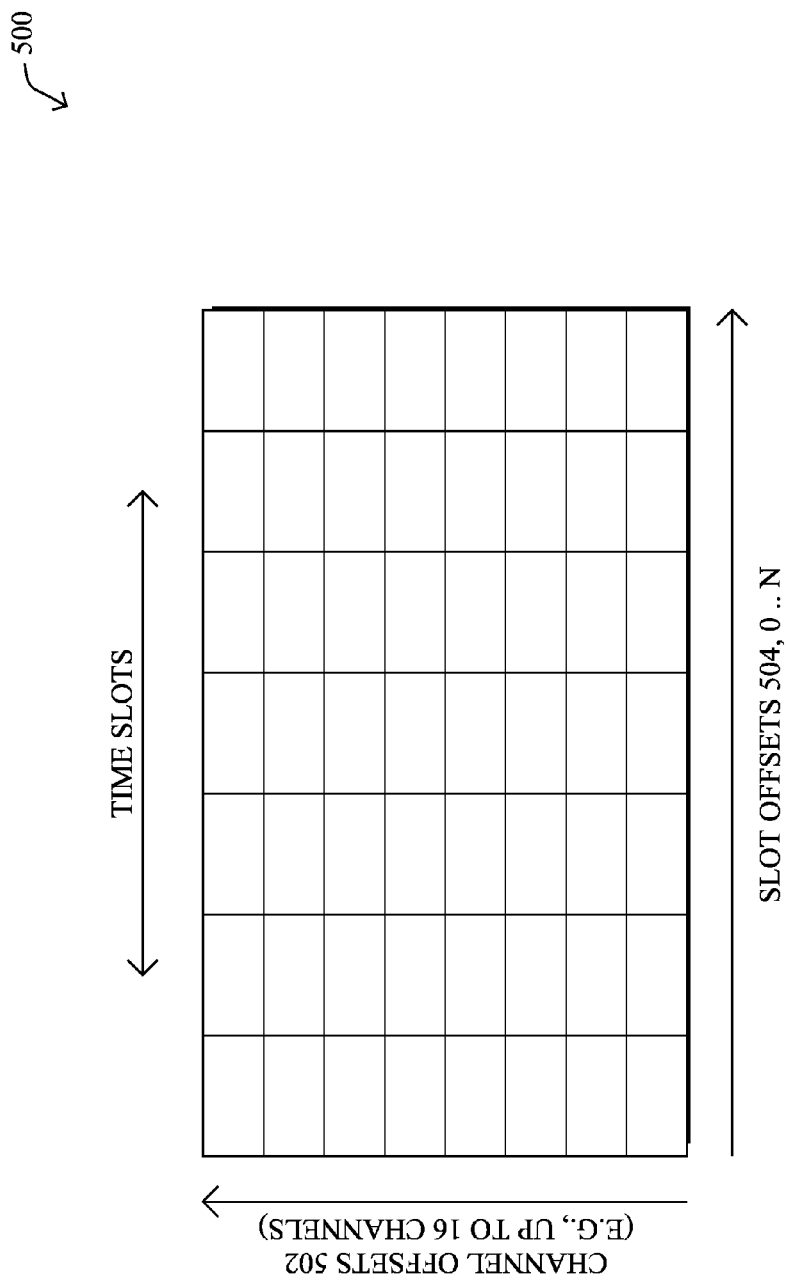
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of time slots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
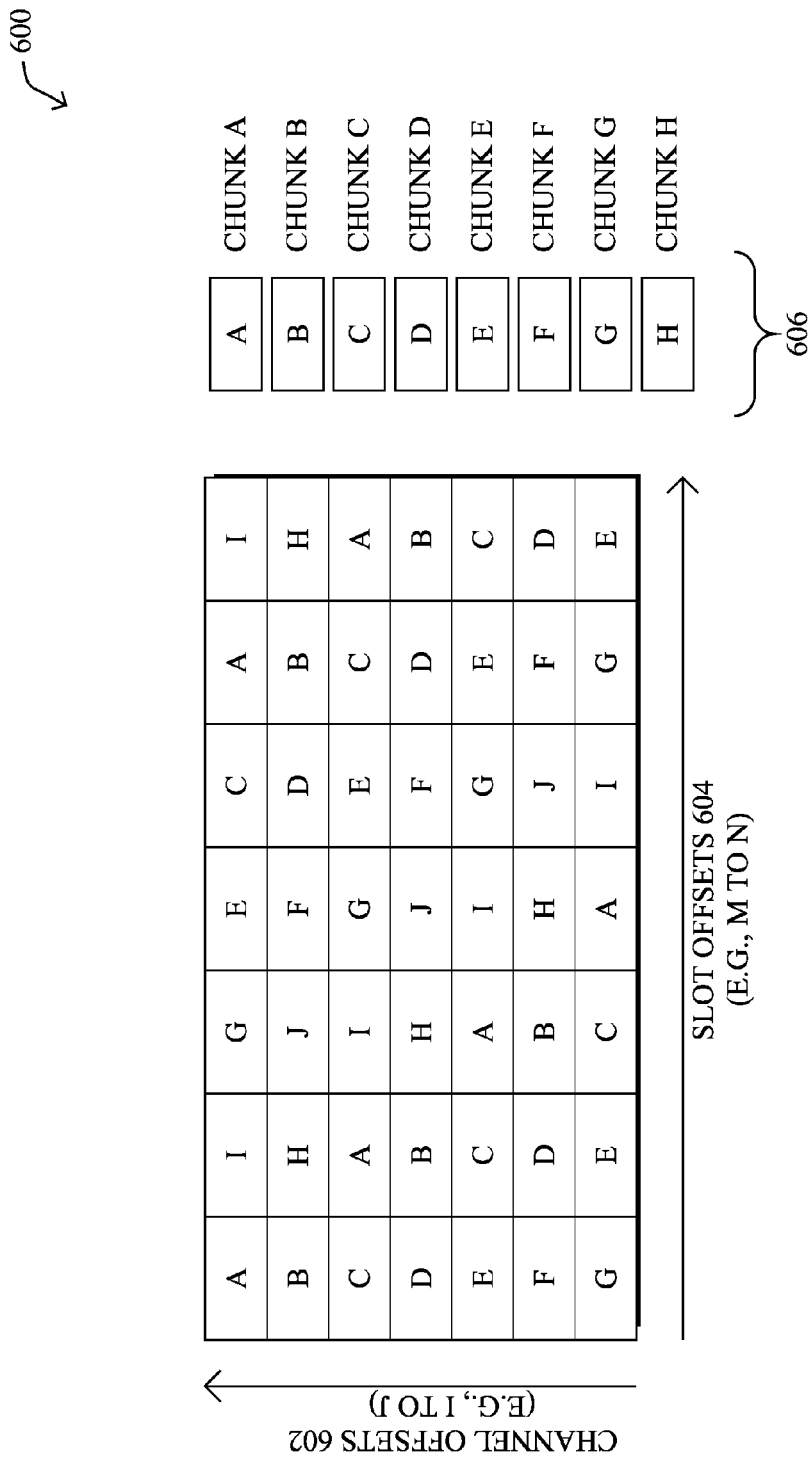
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
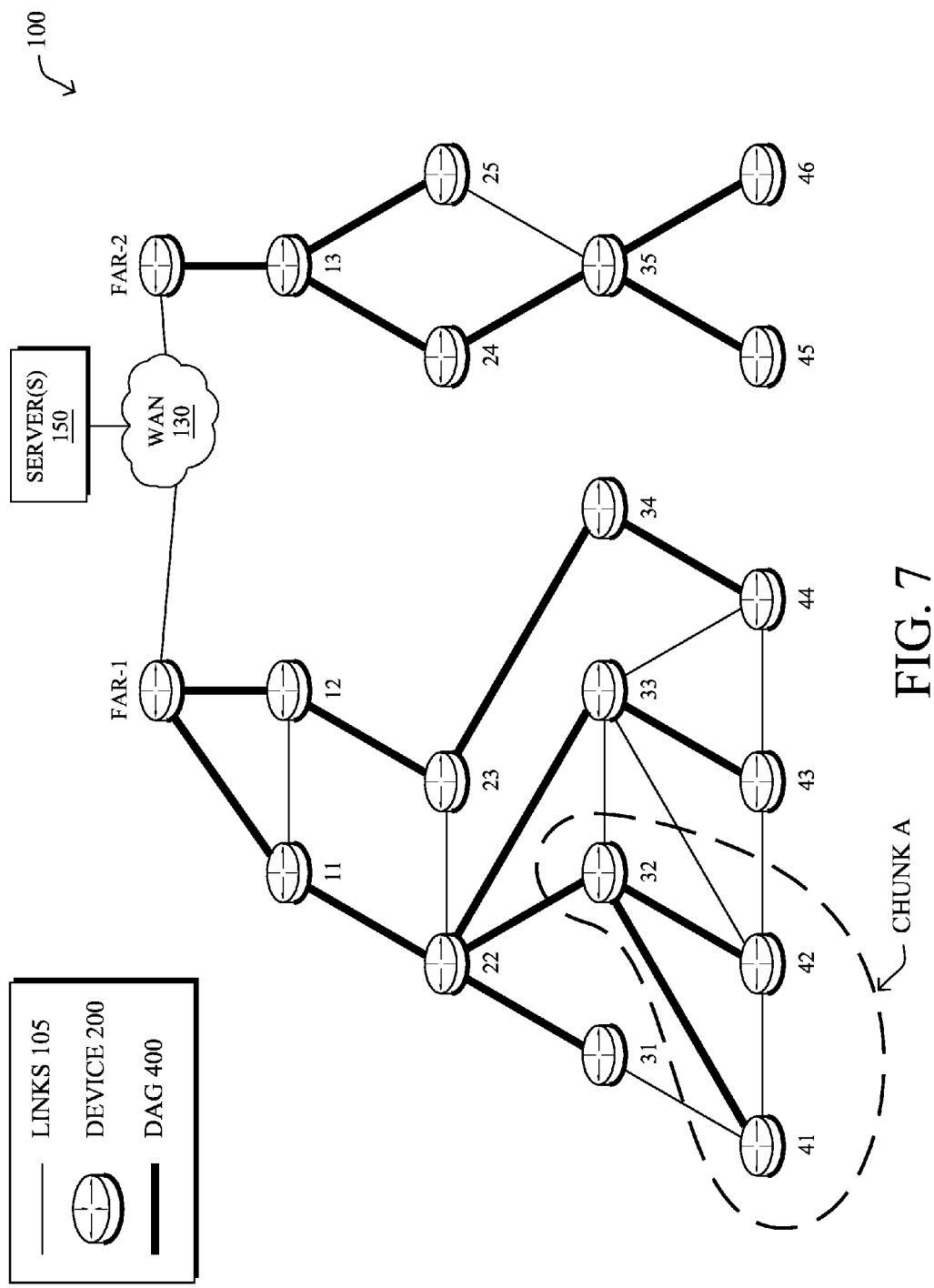
FIGS. 7-8 illustrate examples of a parent node in the network of FIG. 1 scheduling communications for a particular chunk.
Figure 8:
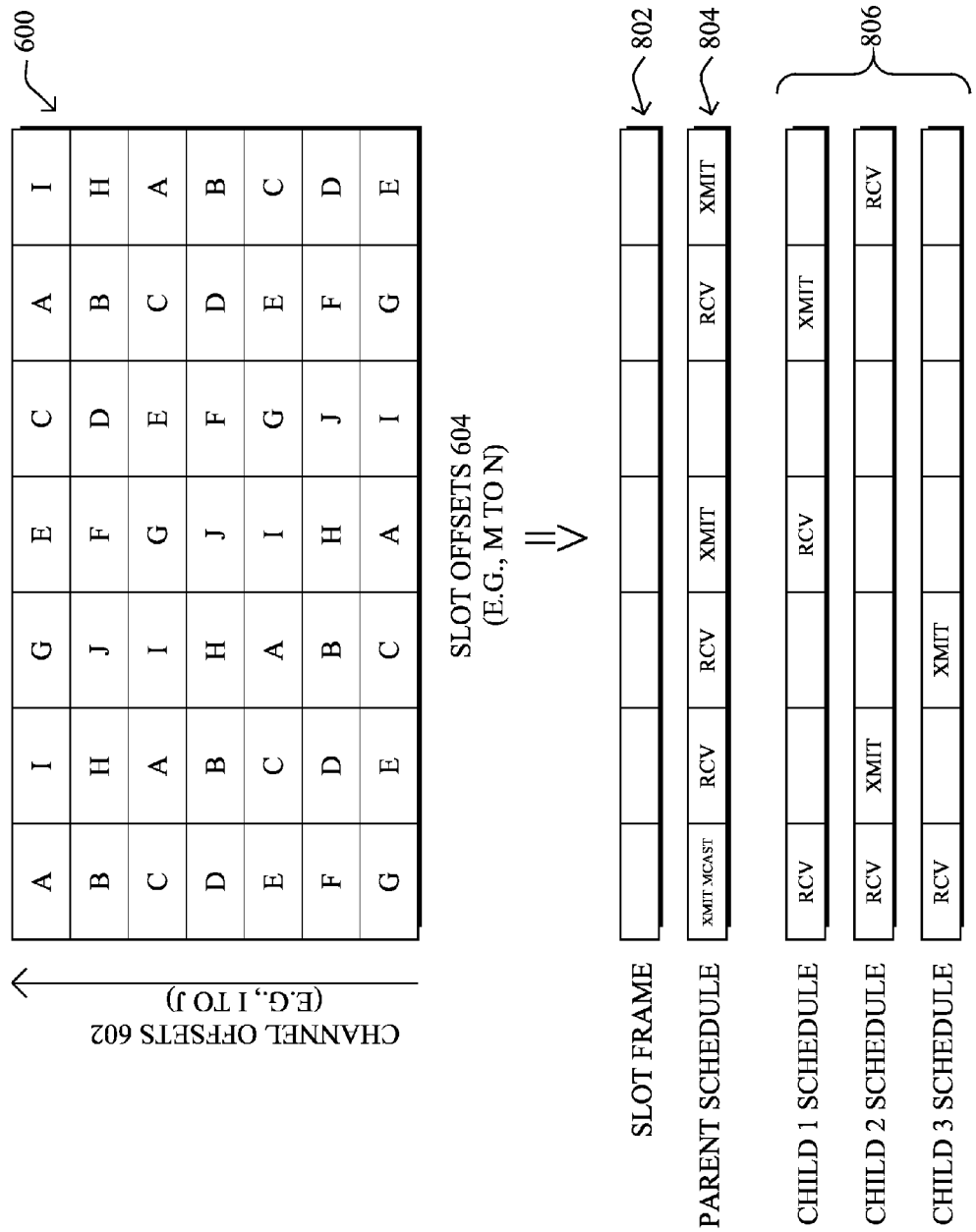

FIGS. 7-8 illustrate examples of a parent node in the network of FIG. 1 scheduling communications for a particular chunk. As shown, assume that node 32 is the parent node of child nodes 41, 42 according to the routing protocol.

Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of time slots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chucks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the time slots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of time slots, with a particular timeslot belonging to at most one track. In this model, a set of input cells (time slots) are uniquely bound to a set of output cells, representing a forwarding state that can be used regardless of the upper layer protocol. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6top sublayer switches it without incurring a change in the MAC header. In the case of IEEE802.15.4e, this means effectively broadcast, so that along the Track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6top sublayer.

As noted above, a routing protocol (e.g., RPL, etc.) may be used with 6TiSCH for distributed routing computations. Such a protocol may allow for delayed (e.g., purposely lazy) routing updates but may not indicate when the delayed update should take place beyond that they should occur upon detection of forwarding failures. In particular, depending on the specific link layer protocol that is used for neighbor discovery, the routing protocol may detect a change that would affect traffic routing in either the up/down links between nodes or the based on the links' metrics. In some cases, the resulting changes may not be applied immediately due to variations in the wireless links between nodes or the bandwidth needed to report such a change is highly constrained. Thus, the routing protocol may allow for a lazy update that can take place, for example, upon the detection along the data path of a packet that a broken route is being utilized for that packet. Typically, this may result in the loss of the packet and the loss of subsequently sent packets along that same path until the routing has recovered. Also as noted above, when a node decides that a routing change should be advertised, it may issue a control message (e.g., a DAO or a DIO message). The control message will then percolate all to way to the root, causing control traffic that is specific to that update to be transmitted all the way to the root, but failing to aggregate other changes in the network. In 6TiSCH and similar environments in which energy and bandwidth are constrained, the non-aggregated routing protocol traffic may impact network performance.

Synchronized Routing Updates for TSCH Networks

The techniques herein leverage the time synchronized and timeslotting properties of a TSCH network to schedule routing protocol updates (e.g., DAO messages using RPL, etc.). In some aspects, a parent node may aggregate all updates from its child nodes before generating and sending an aggregated update message to its parent node. In further aspects, techniques are disclosed that allow the reporting schedules to be adjusted dynamically, to adapt to a change in the size or topology of the network. Such scheduling techniques may be centralized or distributed, according to various implementations.

Specifically, according to one or more embodiments of the disclosure as described in detail below, a network node provides a time slotted channel hopping (TSCH) schedule to one or more child nodes of the network node. The TSCH schedule includes one or more mandatory routing protocol report time slots. The network node receives routing protocol reports from the one or more child nodes according to the TSCH schedule. The network node aggregates the received routing protocol reports into an aggregated routing protocol report. The network node provides the aggregated routing protocol report to a parent of the network node during a time slot that is subsequent to the one or more mandatory time slots for the one or more child nodes.

Illustratively, the techniques described herein may be performed by hardware, software, and/or firmware, such as in accordance with the channel hopping process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols (e.g., IEEE 802.15.4e 6TiSCH, etc.), and as such, may be processed by similar components understood in the art that execute those protocols, accordingly.

Operationally, a schedule may be populated to advertise lazy routing changes in such a way that information regarding the routing changes is aggregated from the bottom up from the leaves of the network all the way to the root node of the network. For example, the techniques herein may be used in TSCH networks (e.g., 6TiSCH) that use a storing mode of a routing protocol (e.g., RPL, etc.). In particular, network nodes may take advantage of the reporting schedule to switch parents and report on the new parents and/or any corresponding metrics with the parents. Reporting time slots in which child node(s) report to a given parent, with eventual retries, may be scheduled prior to the reporting time slot of the parent node in which the parent node reports to its own parent(s).

Figure 9A:
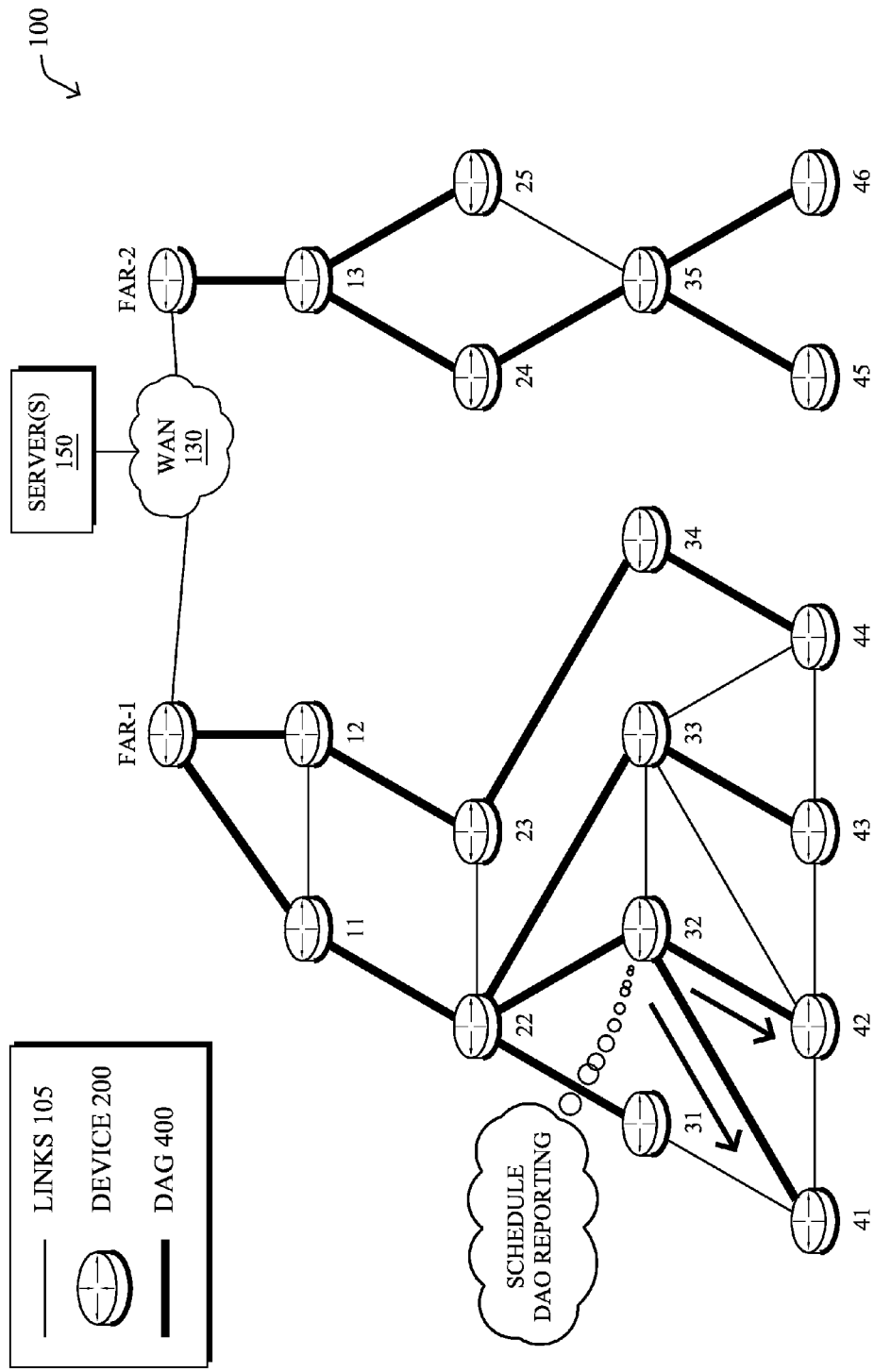
FIGS. 9A-9C illustrate a device/node in the network of FIG. 1 sending an aggregated routing protocol report to its parent node.
Figure 9B:
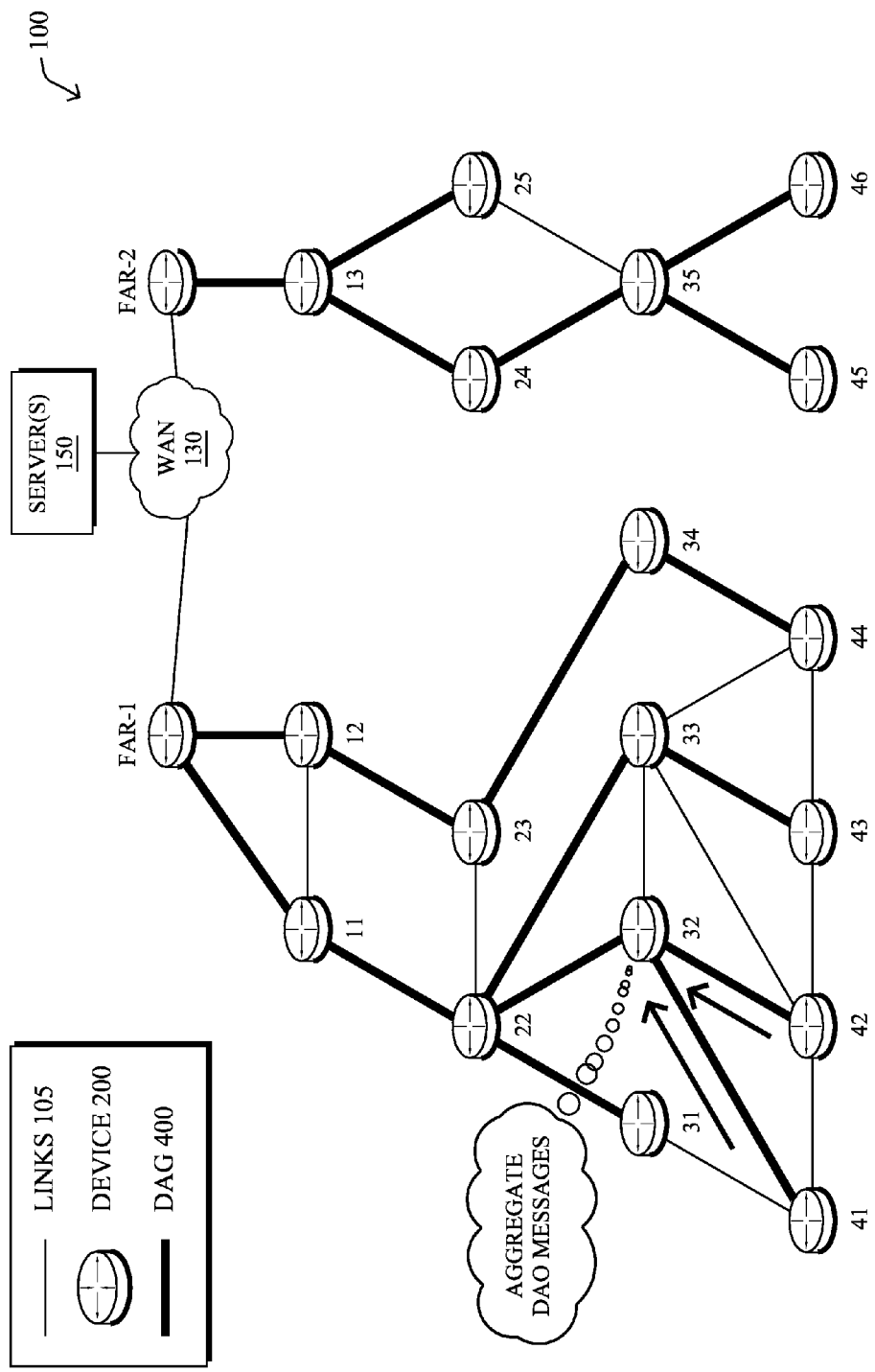
Figure 9C:
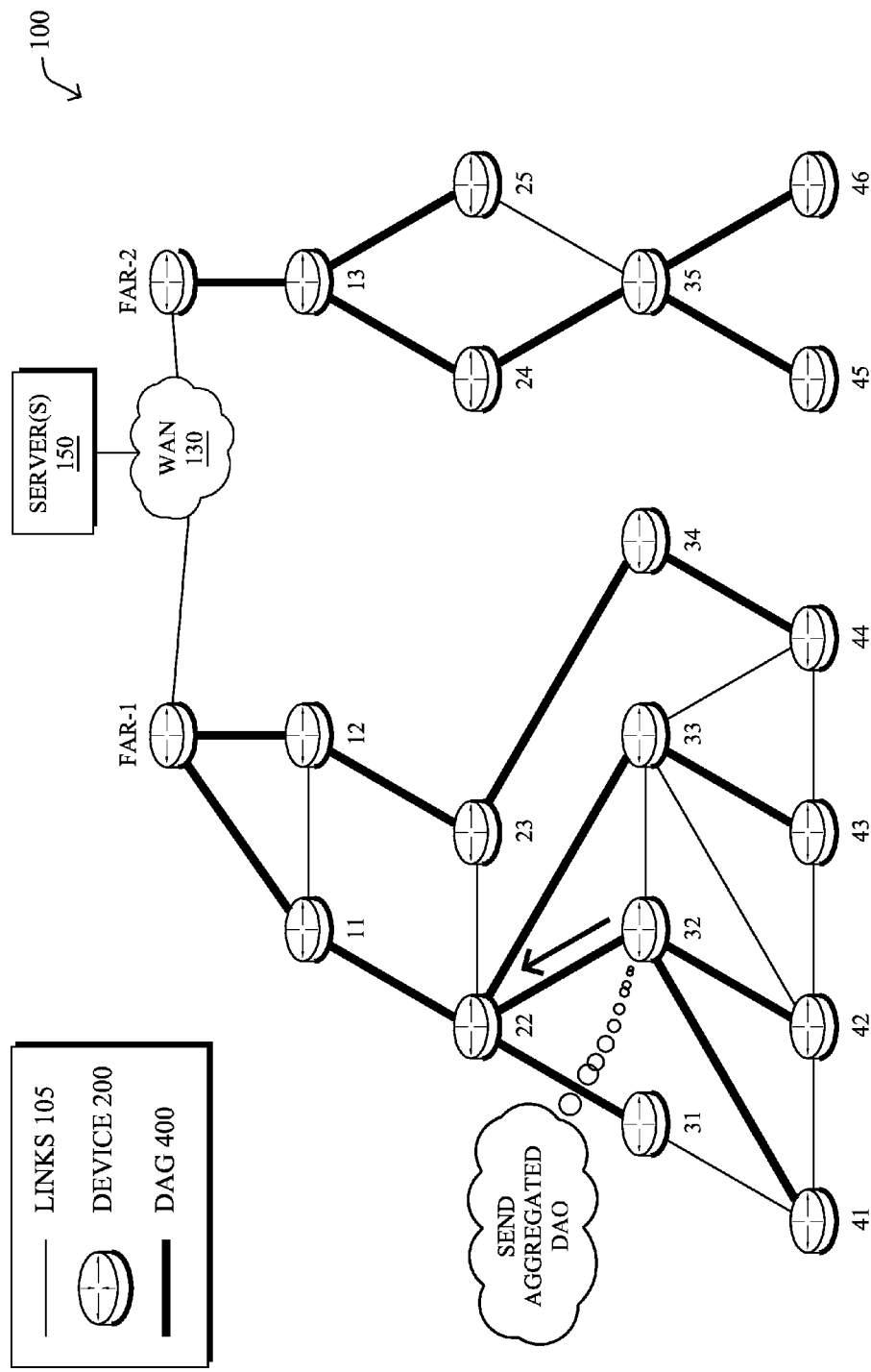

An example of a device/node in network 100 sending an aggregated routing protocol report to its parent node is shown in FIGS. 9A-9C, according to various embodiments. As shown in FIG. 9A, parent node 32 of child nodes 41 and 42 may schedule the routing protocol reporting of nodes 41, 42 by assigning reporting time slots to nodes 41, 42 in the TSCH schedule (e.g., using a chunk owned by node 32). As noted above, the timeslot assignments to child nodes 41, 42 may be based on the reporting schedule of node 32 such that nodes 41, 42 are scheduled to report to node 32 prior to node 32 reporting to its own parent node 22.

During the scheduled reporting times, the child nodes of a parent may then provide routing protocol reports to the parent node. For example, as shown in FIG. 9B, child nodes 41, 42 may send DAO messages to parent node 32 at their scheduled reporting times. In response, the parent node may then aggregate the information from all of its children (e.g., including a lack of reporting from a child node, in the case of a lost adjacency), to compress the reports into as few messages as possible. For example, node 32 may aggregate the received reports from nodes 41, 42, or lack thereof, to form an up-to-date view of its portion of network 100. Then, as shown in FIG. 9C, node 32 may send a DAO message to its own parent 22 that aggregates the information regarding nodes 41, 42 during the reporting timeslot assigned to node 32.

Figure 10:
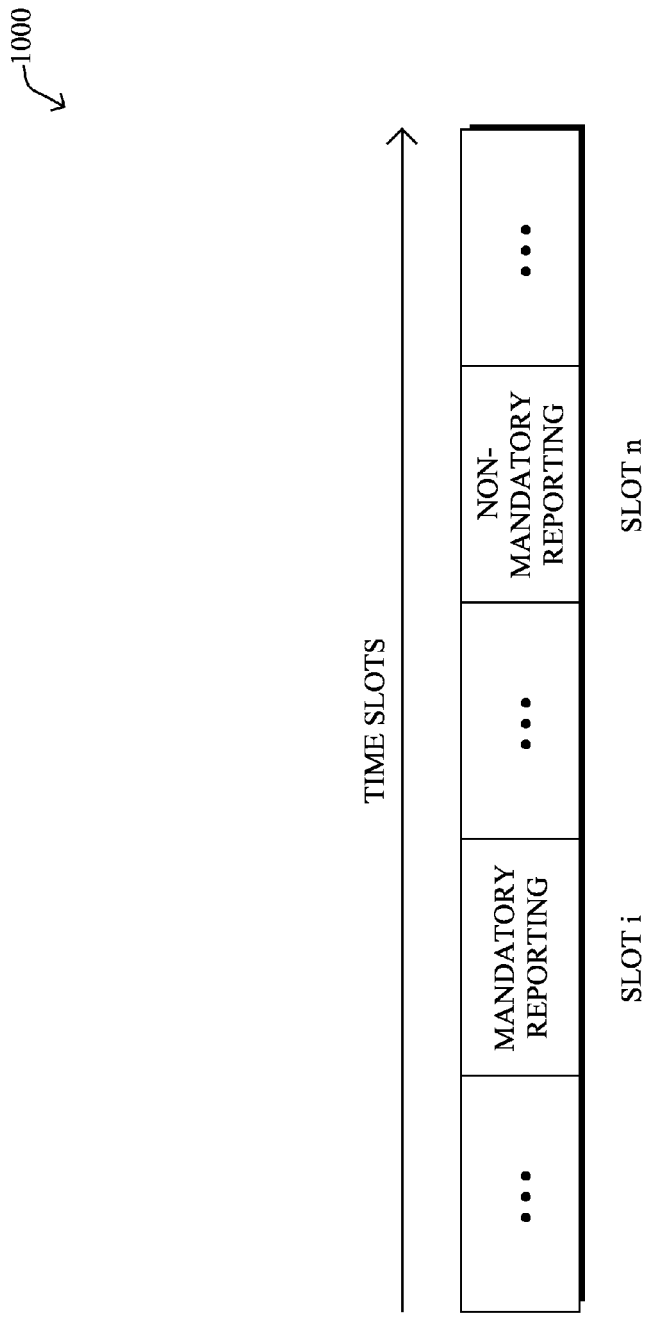
FIG. 10 illustrates example reporting time slots.

FIG. 10 illustrates example reporting time slots of a TSCH schedule 1000, according to various embodiments. Notably, the timeslots shown correspond to cells of the CDU matrix (e.g., as part of a chunk) and may be associated with corresponding channels, as part of a channel hopping mechanism. In some embodiments, one or more of the scheduled reporting time slots assigned to a node may be mandatory. In other words, the child node may be required to send a routing protocol report (e.g., a DAO message), even if the routing state of the node is below a reporting threshold. For example, as shown, timeslot i in the assigned schedule 1000 may be a mandatory reporting timeslot. Failure of a child node to report during such a mandatory timeslot, and potentially factoring in MAC layer retries, may be treated by the parent node as a broken link adjacency. In response, the parent node may remove all routes associated with the child node from its set of available routes.

In some cases, non-mandatory reporting time slots may also be assigned to a child node. For example, as shown in FIG. 10, timeslot n may be designated as a non-mandatory reporting timeslot. During a non-mandatory timeslot, the parent node may listen for a routing protocol report from the child node, but such a report may or may not be sent. In some cases, the child node may opportunistically use the non-mandatory reporting timeslot to send other traffic to the parent node, if the child node does not have a significant routing-related change to report (e.g., any changes observed by the child node fall below a reporting threshold). Typically, the number of non-mandatory time slots assigned to a node may be greater than the number of mandatory time slots, thereby limiting the impact of the routing protocol reports on the control plane. However, mandatory time slots may still be allocated such that required reporting is imposed periodically to reassess the topology of the network.

Scheduled mandatory and non-mandatory time slots may form a TSCH bundle. The size of the bundle may be adjusted dynamically using control messages. For example, the size of a bundle may be increased dynamically using control messages over the 6top to 6top interface in 6TiSCH.

Figure 11A:
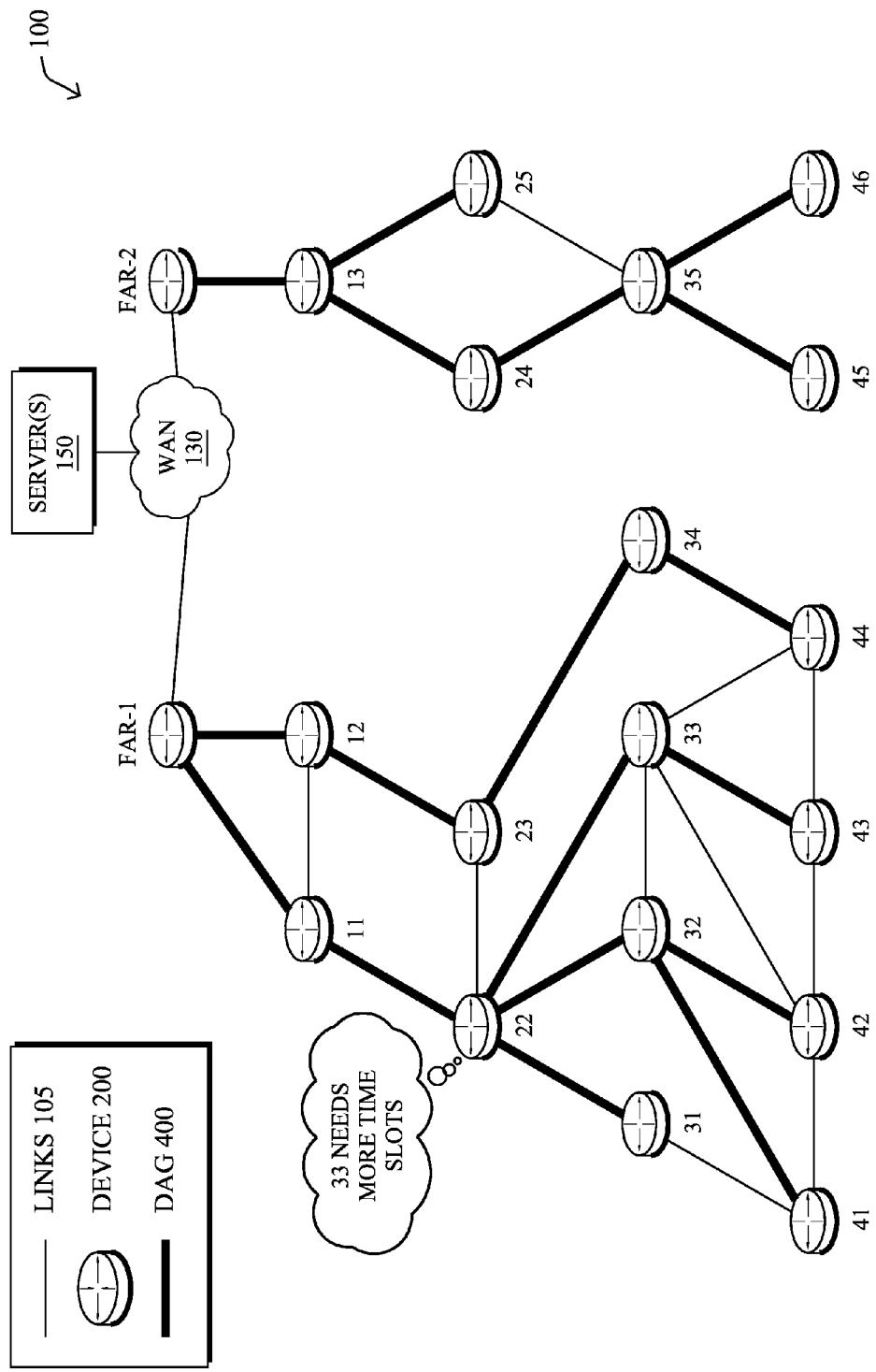
FIGS. 11A-11D illustrate an example of reporting time slots being adjusted.

In some situations, a child node may need more routing protocol reporting time slots. In one particular case, a child node may require more time slots to accommodate a burst of correlated DAO messages for the same routing update. For example, as shown in FIG. 11A, assume that a routing update causes node 33 to receive a burst of DAO messages from its corresponding child node(s), thus requiring more time reporting time slots (e.g., by notifying its parent node 22 that more time slots are needed). In such a case, parent node 22 may provide a cell that fits within the transmission schedule before its own respective reporting timeslot (e.g., to report to node 11), to allow time for the child node reports to be aggregated.

Figure 11B:
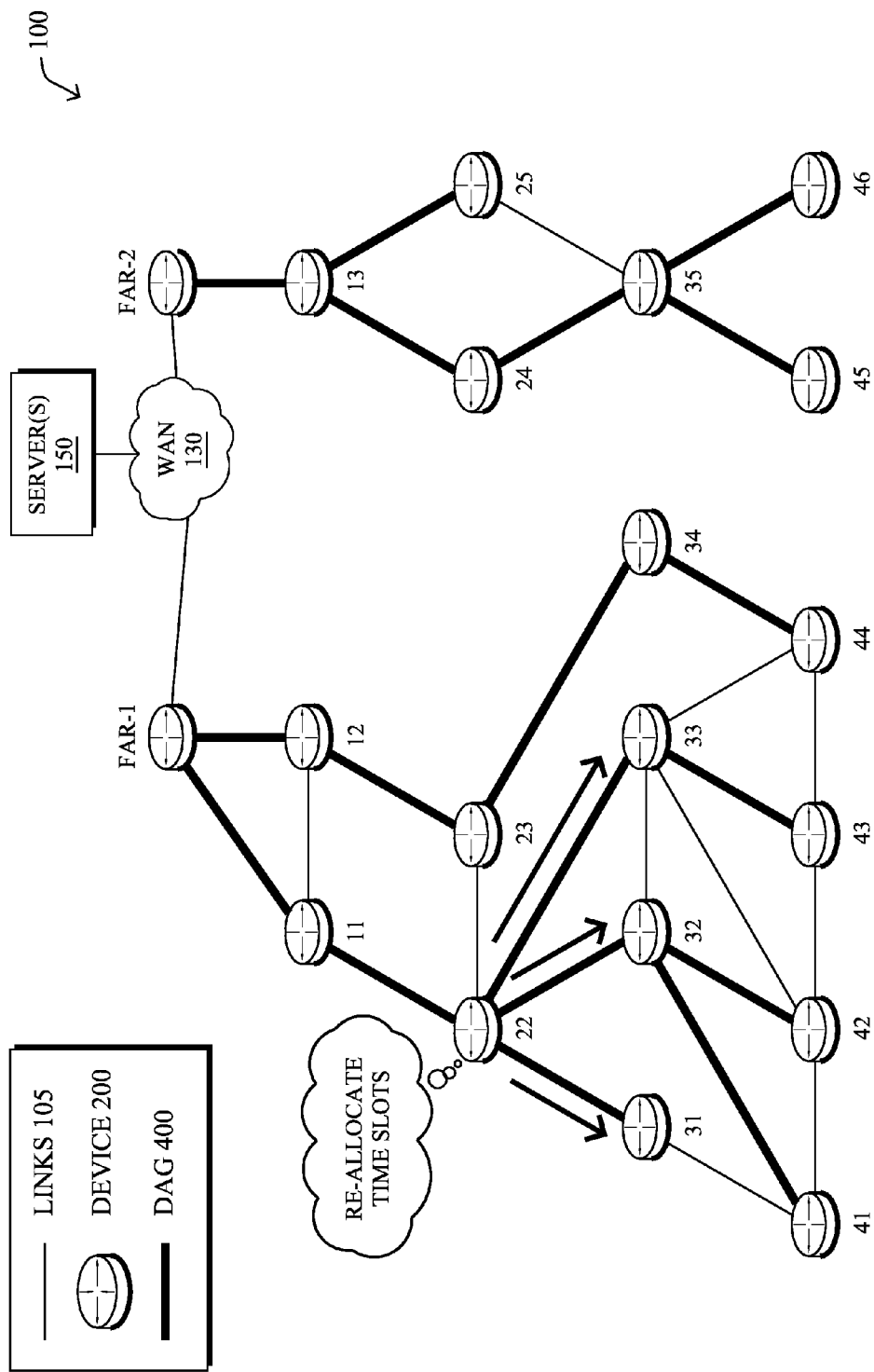
Figure 11C:
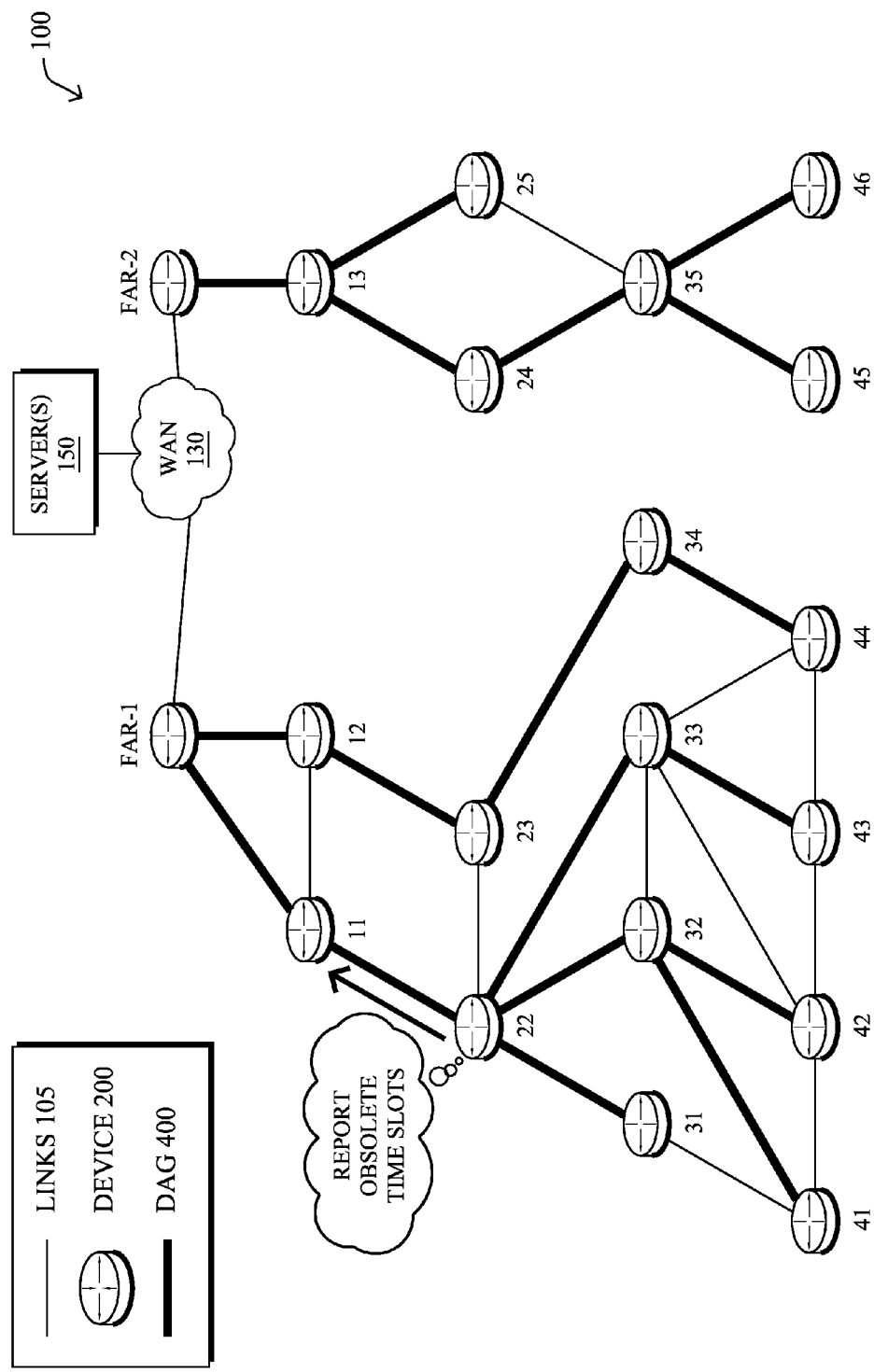
Figure 11D:
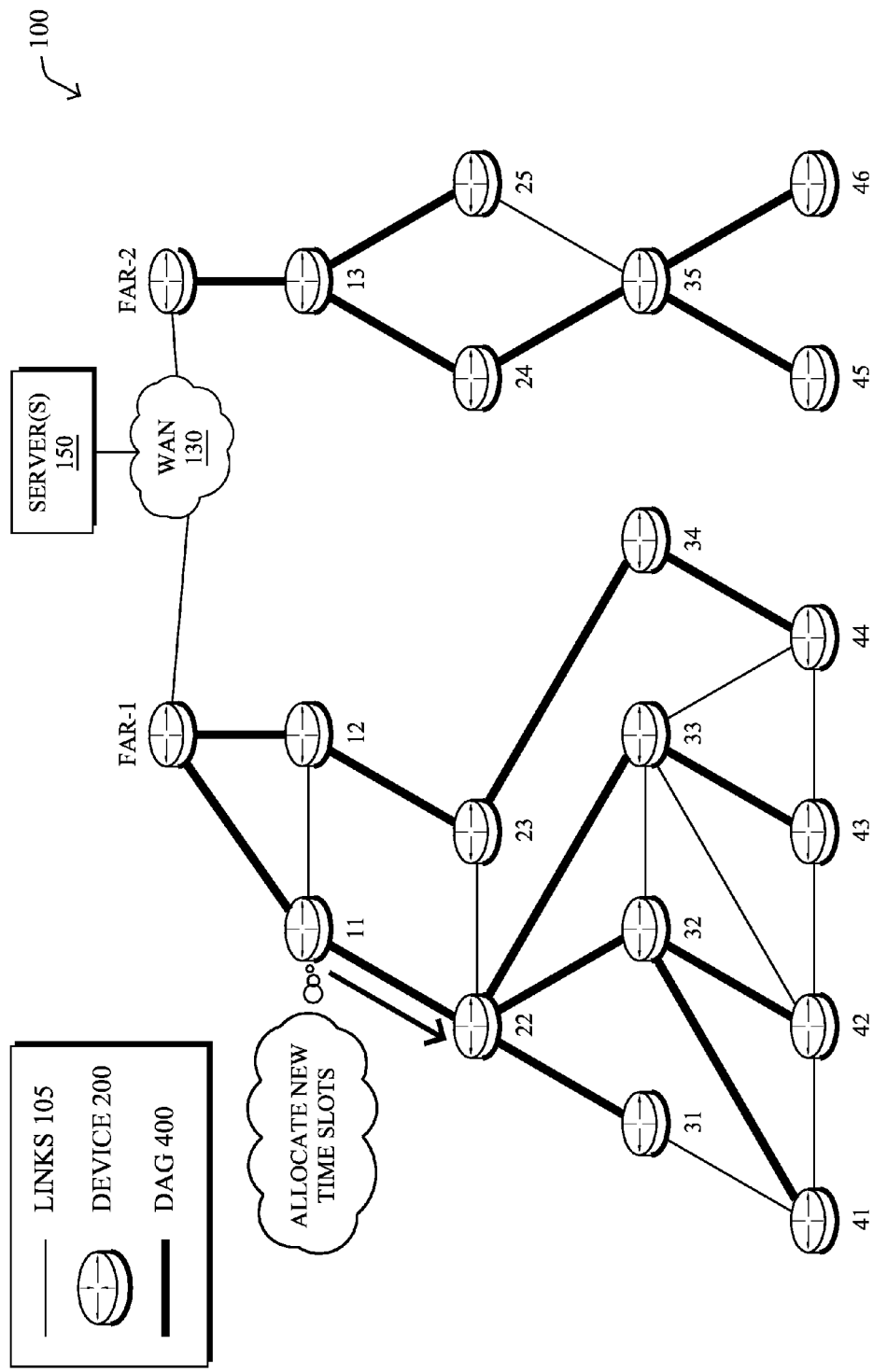

If no cell of the transmission schedule is available for allocation to a child node, the parent node may shift its own transmission schedule in time. For example, as shown in FIG. 11B, parent node 22 may reallocate time slots to its child nodes 31-33, to allocate more reporting time slots to child node 33. Next, as shown in FIG. 11C, parent node 22 may mark any or all of the time slots in its own transmission schedule that are anterior to the reporting timeslot newly allocated to node 33 as obsolete. Parent node 22 may then report the obsolete time slots to its own parent node 11, to negotiate a new routing protocol reporting schedule for node 33. For example, node 22 may negotiate with node 11 over the 6top to 6top interface of 6TiSch, to de-allocate the obsolete time slots. In turn, node 22 may then allocate new reporting time slots to node 33 that are later in time, as shown in FIG. 11D. Notably, the newly allocated time slots to node 22 may cause some of the time slots assigned to node 11 to also become obsolete (e.g., a new reporting timeslot assigned to node 22 occurs after the corresponding timeslot for node 11, meaning not enough time is provided for node 11 to aggregate reports from its child node(s)). In this situation, the de-allocation/re-allocation process may be repeated any number of times recursively throughout network 100 up to the root/FAR node, effectively adding latency to the complete routing update provided to the root.

Figure 12A:
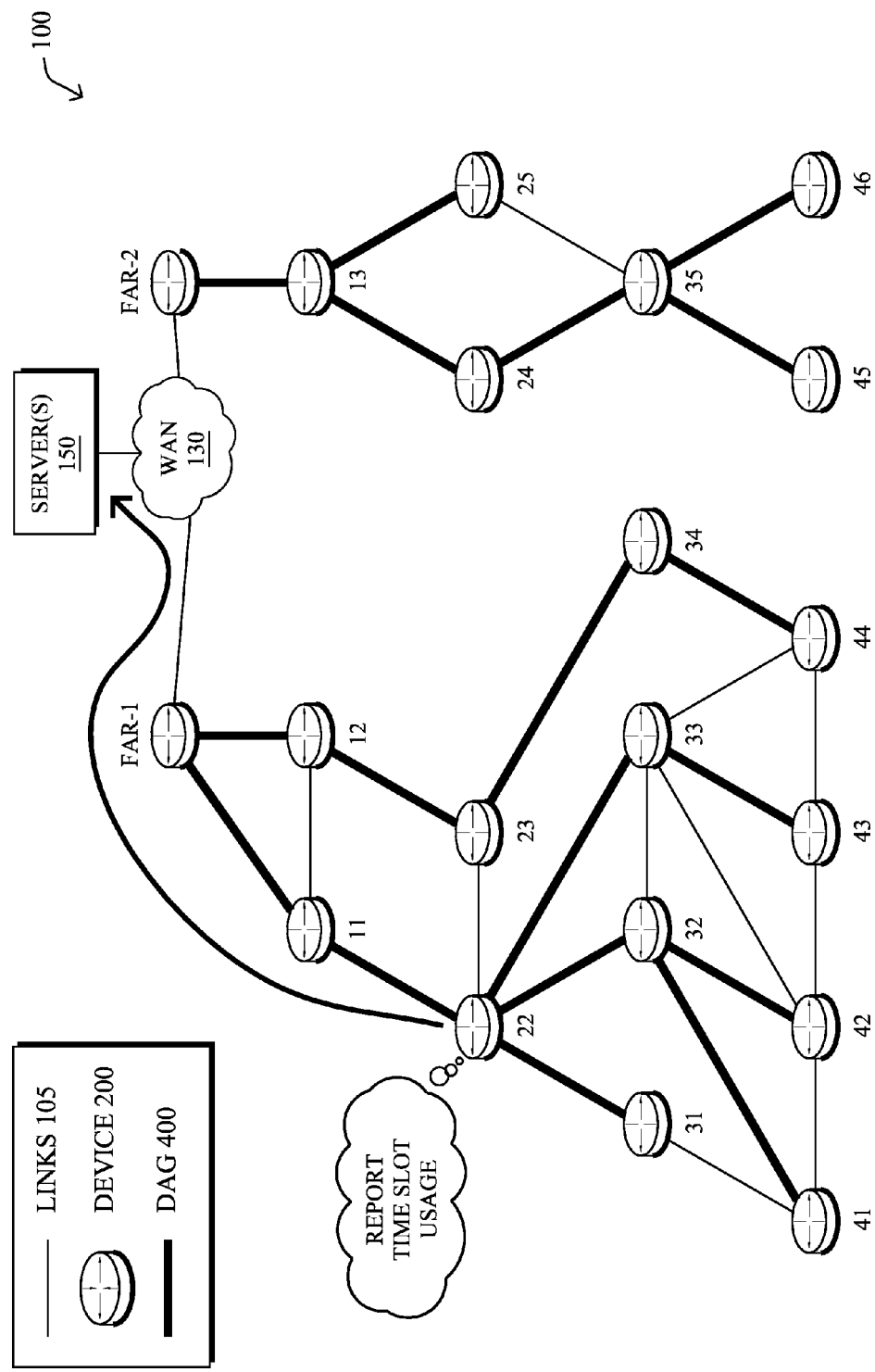
FIGS. 12A-12B illustrate an example of time slots being adjusted by a central network device.
Figure 12B:
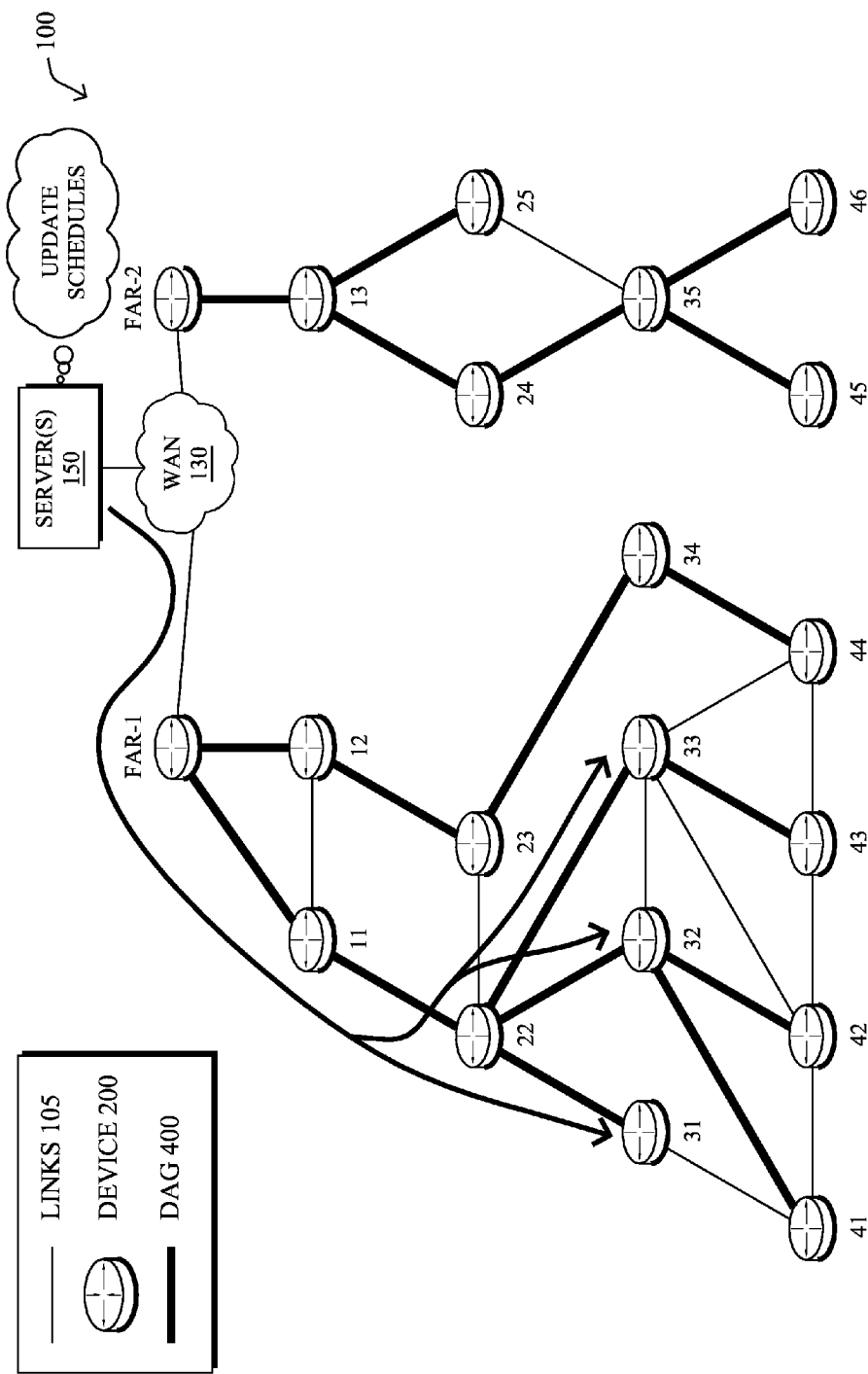

Referring now to FIGS. 12A-12B, an example is shown of centralized time slots adjustments being made, according to some embodiments. In a centralized scheduling approach, the usage of the scheduled routing report time slots may be reported to a PCE or other centralized network device (e.g., one of servers 150), as shown in FIG. 12A. Using this information, the PCE or other device may recompute the reporting schedules of the network devices, to make room as the network grows. The PCE may then install the updated reporting schedules to the various devices, as shown in FIG. 12B.

In some cases, the centralized computation of routing report time slots may be performed periodically and operated over as many time frames as there are leaf nodes times the number of hops for that leaf node. Such a time frame may be an arbitrary period of time that may or may not be directly related to the TSCH slotframe in use by the network. All leaves may then send their reports (e.g., DAO messages) in their own period, eventually reusing the same time slots from previous leaves, if the time frame is congruent to the slotframe. A parent node may then be added as soon as reporting for all of its child nodes has been scheduled, and with as many time frames in a row as it has leaves in its subDAG. This addition may be performed recursively until all nodes are scheduled excluding the root itself.

Figure 13:
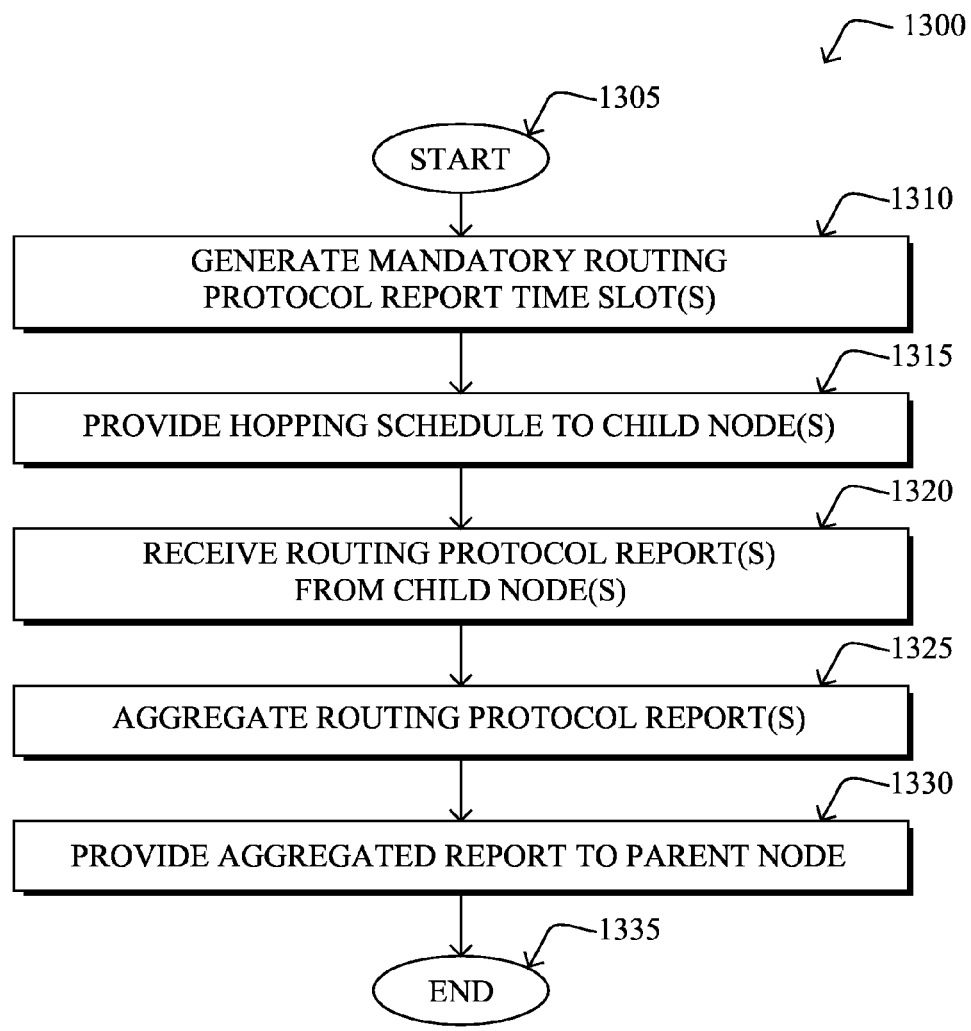
FIG. 13 illustrates an example simplified procedure for aggregating routing protocol reports.

FIG. 13 illustrates an example simplified procedure for aggregating routing protocol reports in accordance with one or more embodiments described herein. The procedure 1300 may start at step 1305, and continues to step 1310, where, as described in greater detail above, one or more mandatory routing protocol report time slots for a time slotted channel hopping (TSCH) schedule are scheduled. In some embodiments, as detailed above, the scheduling may be performed by a parent node of one or more child nodes. For example, the parent node may claim a chunk of a channel distribution/usage (CDU) matrix and use the chunk to assign mandatory routing protocol report time slots (e.g., cells) to its child node(s). During such a time slot, a child node is then required to provide a routing protocol report to the parent node that provides details regarding the routing state of the child node. For example, such a report (e.g., a DAO message in RPL, etc.) may indicate a routing change (e.g., a new node is within range of the child node, an existing neighbor is no longer reachable, etc.) and/or metrics regarding the link states of the child node (e.g., delays, jitter, etc.). In other embodiments, the mandatory routing protocol report time slots may be generated by a centralized network device, such as a PCE.

At step 1315, the TSCH schedule containing the one or more mandatory routing protocol report time slots are provided to the child node(s), as described in detail above. For example, a parent node of the child node(s), or a centralized network device (e.g., a PCE, etc.) via the parent node, may instruct the child node(s) to use a particular TSCH schedule that includes a mandatory routing protocol report time slot. In some embodiments, a non-mandatory routing protocol report time slot may also be included in a TSCH schedule for a given child node. During such a time slot, the child node may report any routing changes or link metrics that exceed a reporting threshold (e.g., the number of dropped packets is above a threshold amount, etc.). However, if the child node has nothing to report, it may instead use the non-mandatory time slot to send a non-routing protocol message to the parent node (e.g., user traffic, etc.).

At step 1320, the parent node of the one or more child nodes receives routing protocol report(s) from the child node(s) according to their installed TSCH schedules, as described in greater detail above. In particular, the parent node may receive a routing protocol report from one of its child nodes during a mandatory reporting time slot or non-mandatory assigned to the child node. In the case of a child node not reporting during a mandatory time slot, the parent node may determine that the corresponding link to the child node has changed, in one embodiment.

At step 1325, the parent node aggregates the routing protocol reports, or lack thereof, from its child node(s) into an aggregated routing protocol report, as described in greater detail above. Such a report may include, for example, the routing information or metrics received from the child node(s) as well as any corresponding information from the parent node. For example, the parent node may include observations regarding its own neighboring devices in the aggregated report.

At step 1330, the parent node provides the aggregated routing protocol report to its own parent node, as detailed above. In particular, and according to various embodiments herein, the reporting timeslot used by the parent node to send the aggregated report to its own parent node may be scheduled to be subsequent to the generated one or more reporting time slots (e.g., mandatory and/or non-mandatory) assigned to its child nodes. Said differently, the reporting time slots assigned to the parent node and to its child nodes may be timed such that the parent node is afforded enough time to receive and aggregate routing protocol reports from each of its child nodes before sending an aggregated report to its own parent node. In various embodiments, such a scheduling may be applied network-wide up to the root node. Procedure 1300 then ends at a step 1335.

Figure 14:
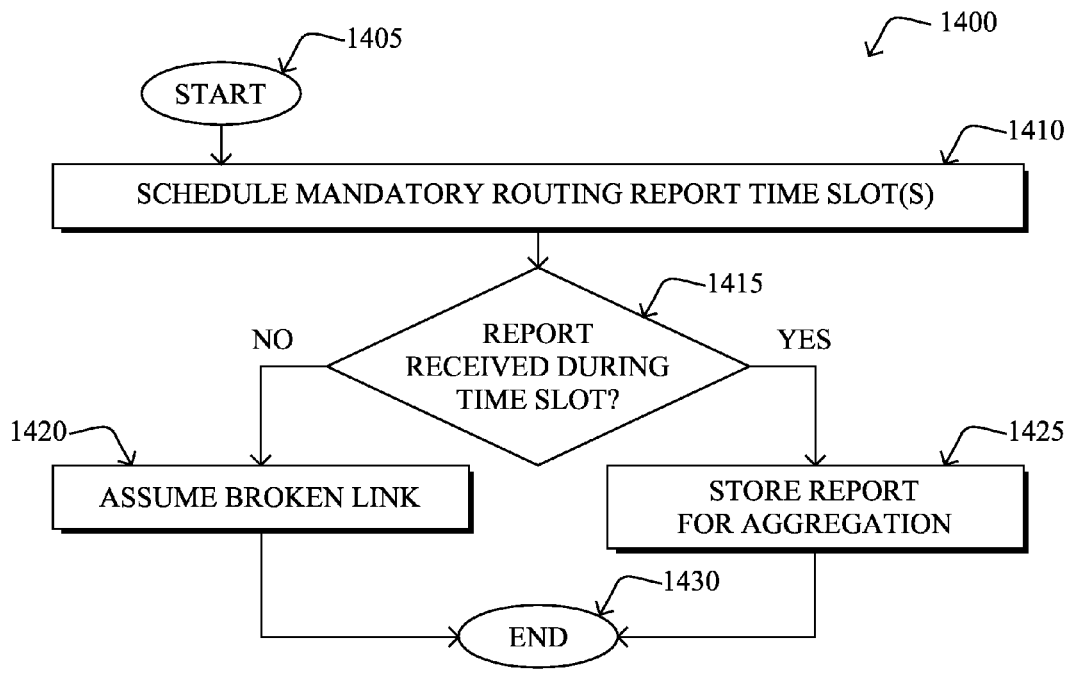
FIG. 14 illustrates an example simplified procedure for evaluating mandatory reporting time slots.

FIG. 14 illustrates an example simplified procedure for evaluating mandatory reporting time slots in accordance with one or more embodiments described herein. The procedure 1400 may start at step 1405, and continues to step 1410, where, as described in greater detail above, mandatory routing protocol report time slots may be scheduled for one or more child nodes of a parent node in the network. During such a time slot, the child node is required to provide a routing protocol report to the parent node. For example, if RPL is used, a particular child node may be required to send a DAO message to its parent during its assigned mandatory time slot.

At step 1415, as described in greater detail above, a decision is made by the parent node as to whether or not a routing protocol report was received by a child node during the mandatory reporting time slot assigned to the child node. Such a decision may also take into account the amount of time needed by the child node to retry sending a routing protocol report to the parent node. If a report is not received, procedure 1400 continues on to step 1420. Otherwise, if a report is received, procedure 1400 continues on to step 1425.

At step 1420, the parent node may determine that the link between itself and the child node that was to report is broken, as described in greater detail above. Said differently, if the parent node does not receive a routing protocol report during a mandatory report time slot assigned to the child node, the parent node may assume that its link with the child node is no longer valid (e.g., the child node has moved out of range, etc.). In some embodiments, such information may be included in an aggregated routing protocol report generated by the parent node that summarizes the states of its child node(s). Procedure 1400 then ends at step 1430.

At step 1425, the parent node may store the received routing protocol report for aggregation, as described in greater detail above. In various embodiments, a reporting time slot for the parent node may be scheduled after those of its child node(s), thereby allowing the parent node to wait for its children to report before generating its own report. Such an aggregated report may also include any observations regarding the state of the network made by the parent node itself. Procedure 1400 then ends at step 1430.

Figure 15:
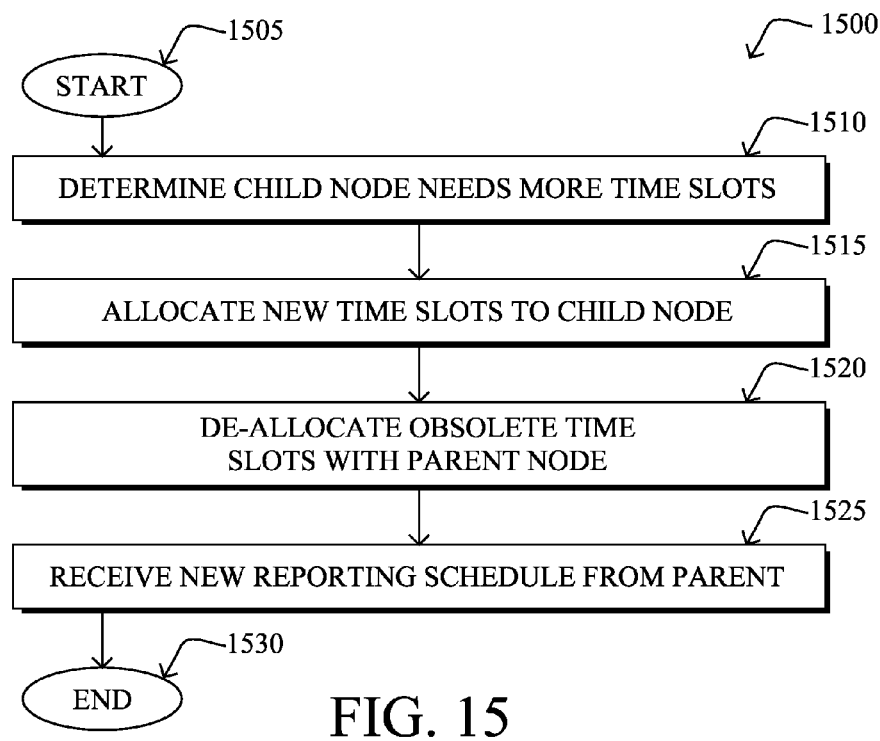
FIG. 15 illustrates an example simplified procedure for adjusting reporting time slots of one or more child nodes.

FIG. 15 illustrates an example simplified procedure for adjusting reporting time slots of one or more child nodes in accordance with one or more embodiments described herein. The procedure 1500 may start at step 1505, and continues to step 1510, where, as described in greater detail above, a determination is made that a particular child node needs more routing protocol report time slots. The determination may be made, for example, by the parent node of the child node, if timeslot allocations are performed in a distributed manner. Alternatively, a centralized network device such as a PCE may make the determination, if a centralized scheduling approach is taken. In one embodiment, the child node may send an indication during a routing protocol report time slot to its parent that additional time slots are needed. For example, the child node may receive an influx of reports from its own children due to a routing change that has occurred in the network.

At step 1515, new routing protocol report time slots are allocated to the child node, as described in greater detail above. The allocated time slots may be mandatory, non-mandatory, or a combination thereof. For example, more non-mandatory reporting time slots may be allocated to the child node than mandatory time slots, to potentially reduce the amount of traffic generated by the routing protocol reports.

At step 1520, obsolete routing protocol report time slot(s) assigned to the parent node are de-allocated, as detailed above. In implementations in which routing protocol report time slots are allocated such that those of the child node(s) occur prior to that of the parent node, some or all of the newly allocated time slots to the child node in step 1515 may occur after the parent's own reporting time slot. In such cases, the parent's time slot may be marked as obsolete and de-allocated.

At step 1525, a new reporting schedule may be received by the parent node, as described in greater detail above. The new schedule may include one or more routing protocol report time slots for the parent node that occur after the new time slots allocated to the parent's child node(s) in step 1515. Thus, the parent node may effectively wait for all reports to be received from its children before sending its own report. In some embodiments, procedure 1500 may be performed recursively in a bottom-up manner throughout the network up to the root node. For example, the new reporting schedule for the parent node may cause a reporting time slot of the parent node's respective parent to also become obsolete. In such cases, procedure 1500 may be repeated with respect to the parent node and its parent, until all nodes in the network again conform to the requirement that each parent node have a reporting time slot that is subsequent to all reporting time slots of its children. Procedure 1500 then ends at a step 1530.

It should be noted that while certain steps within procedures 1300-1500 may be optional as described above, the steps shown in FIGS. 13-15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1300-1500 are described separately, certain steps from each procedure may be incorporated into each other procedure, and the procedures are not meant to be mutually exclusive.

The techniques described herein, therefore, provide for a scheduling mechanism for TSCH networks whereby routing protocol reporting is coordinated. Such a mechanism may reduce packet losses that would otherwise be incurred when using a routing protocol that uses lazy updates. In addition, routing protocol reports from one or more child nodes may be aggregated by a parent node before the parent sends out its own report, thereby reducing the amount of control traffic in the network.

While there have been shown and described illustrative embodiments that provide for the arbitration of time contention in a shared-media communication network, it is to be understood that various other adaptations and modifications may be made within the spirit and scope of the embodiments herein. For example, the embodiments have been shown and described herein primarily with respect to LLNs. However, the embodiments in their broader sense are not as limited, and may, in fact, be used with other types of networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   providing, by a network node, a time slotted channel hopping (TSCH) schedule to one or more child nodes of the network node, the TSCH schedule comprising one or more mandatory routing protocol report time slots;
   receiving, at the network node, routing protocol reports from the one or more child nodes according to the TSCH schedule, wherein the routing protocol reports are RPL updates;

aggregating, by the network node, the received routing protocol reports into an aggregated routing protocol report; and providing, by the network node, the aggregated routing protocol report to a parent of the network node during a time slot that is subsequent to the one or more mandatory time slots for the one or more child nodes.

2. The method as in claim 1, wherein the TSCH schedule includes a non-mandatory routing protocol report time slot.

3. The method as in claim 2, further comprising:
receiving, at the network node, a routing protocol report from a child node during the non-mandatory routing protocol report time slot.

4. The method as in claim 2, further comprising:
receiving, at the network node, a non-routing protocol message from a child node during the non-mandatory routing protocol report time slot.

5. The method as in claim 1, further comprising:
determining, by the network node, that a routing protocol report was not received from a child node during a particular mandatory routing protocol report time slot; and, in response to determining that the routing protocol report was not received,
including, by the network node, an indication in the aggregated routing protocol report that a link to the child node has changed.

6. The method as in claim 1, further comprising:
determining that a particular child node needs additional routing protocol report time slots;
allocating the additional time slots to the particular child node;
notifying, by the network node, the parent that the time slot that is subsequent to the one or more mandatory time slots for the one or more child nodes has become obsolete; and
receiving, at the network node, a new reporting schedule from the parent.

7. The method as in claim 1, wherein the one or more mandatory routing protocol report time slots are periodic over a reporting time schedule.

8. The method as in claim 1, wherein the reporting time schedule is of different length than a slot frame for the TSCH schedule.

9. The method as in claim 1, further comprising:
reporting, by the network node, use of the one or more mandatory time slots to a centralized scheduler.

10. An apparatus, comprising:
one or more network interfaces to communicate with a network;
a processor coupled to the network interfaces and configured to execute one or more processes; and
a memory configured to store a process executable by the processor, the process when executed operable to:
provide a time slotted channel hopping (TSCH) schedule to one or more child nodes of the apparatus, the TSCH schedule comprising one or more mandatory routing protocol report time slots;
receive routing protocol reports from the one or more child nodes according to the TSCH schedule, wherein the routing protocol reports are RPL updates;
aggregate the received routing protocol reports into an aggregated routing protocol report; and
provide the aggregated routing protocol report to a parent of the apparatus during a time slot that is subsequent to the one or more mandatory time slots for the one or more child nodes.

11. The apparatus as in claim 10, wherein the TSCH schedule includes a non-mandatory routing protocol report time slot.

12. The apparatus as in claim 11, wherein the process when executed is further operable to:
receive a routing protocol report from a child node during the non-mandatory routing protocol report time slot.

13. The apparatus as in claim 11, wherein the process when executed is further operable to:
receive a non-routing protocol message from a child node during the non-mandatory routing protocol report time slot.

14. The apparatus as in claim 10, wherein the process when executed is further operable to:
determine that a routing protocol report was not received from a child node during a particular mandatory routing protocol report time slot; and, in response to determining that the routing protocol report was not received,
include an indication in the aggregated routing protocol report that a link to the child node has changed.

15. The apparatus as in claim 10, wherein the process when executed is further operable to:
determine that a particular child node needs additional routing protocol report time slots;
allocate the additional time slots to the particular child node;
notify the parent that the time slot that is subsequent to the one or more mandatory time slots for the one or more child nodes has become obsolete; and
receive a new reporting schedule from the parent.

16. The apparatus as in claim 10, wherein the one or more mandatory routing protocol report time slots are periodic over a reporting time schedule.

17. The apparatus as in claim 10, wherein the reporting time schedule is of different length than a slot frame for the TSCH schedule.

18. The apparatus as in claim 10, wherein the process when executed is further operable to:
report use of the one or more mandatory time slots to a centralized scheduler.

19. A tangible, non-transitory, computer-readable media having software encoded thereon, the software when executed by a processor operable to:
provide, by a network node, a time slotted channel hopping (TSCH) schedule to one or more child nodes of the network node, the TSCH schedule comprising one or more mandatory routing protocol report time slots;
receive routing protocol reports from the one or more child nodes of the network node according to the TSCH schedule, wherein the routing protocol reports are RPL updates;
aggregate the received routing protocol reports into an aggregated routing protocol report; and
provide the aggregated routing protocol report to a parent of the network node during a time slot that is subsequent to the one or more mandatory time slots for the one or more child nodes.

20. The computer-readable media as in claim 19, wherein the TSCH schedule includes a non-mandatory routing protocol report time slot.

* * * * *